US012718150B2

(12) United States Patent
Ito

(10) Patent No.: US 12,718,150 B2
(45) Date of Patent: Aug. 25, 2026

(54) AI QUALITY MONITORING SYSTEM

(71) Applicant: HITACHI SOLUTIONS, LTD., Tokyo (JP)

(72) Inventor: Hidekazu Ito, Tokyo (JP)

(73) Assignee: HITACHI SOLUTIONS, LTD., Tokyo (JP)

( * ) Notice: Subject to any disclaimer, the term of this patent is extended or adjusted under 35 U.S.C. 154(b) by 515 days.

(21) Appl. No.: 18/282,036

(22) PCT Filed: Jan. 17, 2022

(86) PCT No.: PCT/JP2022/001352
§ 371 (c)(1),
(2) Date: Sep. 14, 2023

(87) PCT Pub. No.: WO2022/259592
PCT Pub. Date: Dec. 15, 2022

(65) Prior Publication Data

US 2024/0046150 A1 Feb. 8, 2024

(30) Foreign Application Priority Data

Jun. 11, 2021 (JP) ................................ 2021-098047

(51) Int. Cl.
*G06N 20/00* (2019.01)
*G06N 5/04* (2023.01)

(52) U.S. Cl.
CPC ............... *G06N 20/00* (2019.01); *G06N 5/04* (2013.01)

(58) Field of Classification Search
CPC ................................ G06N 20/00; G06N 5/00
See application file for complete search history.

(56) References Cited

U.S. PATENT DOCUMENTS

2021/0027136 A1 * 1/2021 Hwang .................. G06N 3/082

FOREIGN PATENT DOCUMENTS

JP 2021-009618 A 1/2021

OTHER PUBLICATIONS

International Search Report of PCT/JP2022/001352 Mar. 1, 2022.

* cited by examiner

*Primary Examiner* — Maryam A Nasri
(74) *Attorney, Agent, or Firm* — MATTINGLY & MALUR, PC

(57) ABSTRACT

The objective of the present disclosure is to provide a technique capable of efficiently monitoring quality of learning model without depending on input data. An AI quality monitoring system according to the present disclosure acquires an inferred result acquirable from a compared model inferring with respect to input data of same type as learning data learned by a learning model, and then compares the inferred result acquired from the compared model with correct answer data, thereby calculating an evaluation value representing how much the compared model is appropriate for determining quality of the learning model (refer to FIG. 1).

12 Claims, 17 Drawing Sheets

1

10

20 onsite correct / incorrect determining system (3) data collection

AI using system (2) model / parameter registration (4) correct / incorrect determination result cloud monitoring system (1) configurations (5) view result monitoring site observer operation terminal

1. configuration / model selection evaluation target configuration system name: ○○system
AI model name: model A
task: multiple classification
input size: 3, 28, 28
input data type: float32
output size: 10
output data type: float32
model format: ONNX format
model data: model_A.onnx
refer compared model configuration model pair number limit: 3 - 10
process time limit [ms]: 1000
determination threshold: 0.5
⋮ compared model (candidate)

AI model name: model B
model format: ONNX format
model data: model_B.onnx
refer
add model list

| # | model name | format | data |
|---|---|---|---|
| 1 | model B | ONNX | model_B.onnx |
| ... | ... | | ... |

model selection configuration verifying method: Category : confusion matrix
evaluation indicator: category : F measure
evaluation threshold: 0.9
⋮ test dataset dataset name: dataset A
data format: JSON format
dataset: anotattion.zip
refer dataset list

| # | input data | correct answer data |
|---|---|---|
| 1 | data1.jpg | {...} |
| ... | | ... |

configure complete

FIG. 9A compared model confirmation compared model list (selected model pair) show details confirm reconfigure

| model pair correct / incorrect determination score | correct / incorrect determination evaluation value | | verification result of each model | | | | | |
|---|---|---|---|---|---|---|---|---|
| | evaluation indicator | evaluation value | evaluation indicator | confirmation target AI | model B | model D | model M | model P |
| **98/100 points (passed)** | category : F measure | 0.98 | category : F measure | 0.96 | 0.92 | 0.98 | 0.97 | 0.98 |
| | bias | 0.15 | average inferring time | 10ms/pred. | 11ms/pred. | 9ms/pred. | 10ms/pred. | 12ms/pred. |
| | ... | ... | ... | ... | ... | ... | ... | ... |

list (all model pairs)

| manual selection | score | model pair | details |
|---|---|---|---|
| ⦿ | 98 points | model B, model D, model M, ... | show details |
| ○ | 97 points | model B, model D, model J, ... | show details |
| ○ | 96 points | model C, model D, model M, ... | show details |
| ... | ... | ... | ... |

FIG. 9B details of model pair result : compared model result list of verification data

| select | # | input data | correct answer data | confirmation target AI result | correct / incorrect determination result |
|---|---|---|---|---|---|
| ⦿ | 1 | data1.jpg | {...} | {...} | {...} |
| ○ | 2 | data2.jpg | ... | ... | ... |
| ... | ... | ... | ... | ... | ... |

correct / incorrect determination evaluation value

| select | evaluation indicator | evaluation value |
|---|---|---|
| ⦿ | category : F measure | ... |
| ○ | bias | ... |
| ... | ... | ... |

evaluation indicator (fig / table)

| confusion matrix | | infer | |
|---|---|---|---|
| | | ... | ... |
| true value | ... | ... | ... |
| | ... | ... | ... |

Recall=...
Precision=...
F-measure=...

result
(image classification)
1 data1.jpg image

| | | result | Conf. | ... |
|---|---|---|---|---|
| confirmation target AI model | | category 1 | 0.98 | ... |
| compared model | model B | category 2 | 0.95 | ... |
| | model D | category 2 | 0.92 | ... |
| | model M | category 1 | 0.80 | ... |
| | model P | category 2 | 0.99 | ... |
| | correct answer (infer) | category 2 | 0.95 | ... |
| correct answer (true value) | | category 2 | | |
| correct / incorrect determination result | | false | | |
| correct / incorrect determination performance evaluation | | TP | | |

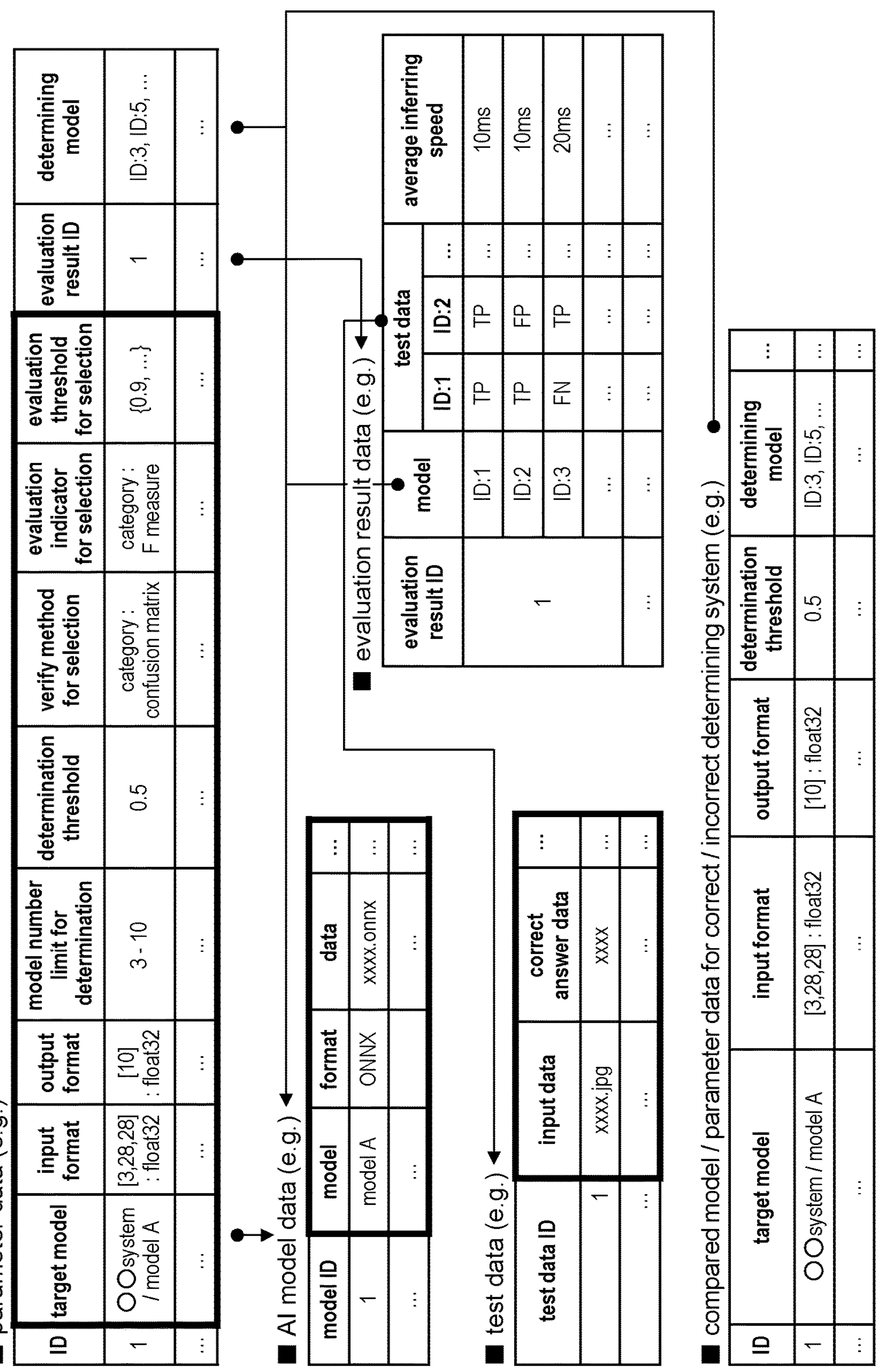
FIG. 12
configured by user
■ parameter data (e.g.)
ID
target model
input format
output format
model number limit for determination
determination threshold
verify method for selection
evaluation indicator for selection
evaluation threshold for selection
evaluation result ID
determining model
1
○○system / model A
[3,28,28] : float32
[10] : float32
3 - 10
0.5
category : confusion matrix
category : F measure
{0.9, ...}
1
ID:3, ID:5, ...
■ AI model data (e.g.)
model ID
model
format
data
1
model A
ONNX
xxxx.onnx
■ test data (e.g.)
test data ID
input data
correct answer data
1
xxxx.jpg
xxxx
■ evaluation result data (e.g.)
evaluation result ID
model
test data
ID:1
ID:2
average inferring speed
1
ID:1
TP
TP
10ms
ID:2
TP
FP
10ms
ID:3
FN
TP
20ms
■ compared model / parameter data for correct / incorrect determining system (e.g.)
ID
target model
input format
output format
determination threshold
determining model
1
○○system / model A
[3,28,28] : float32
[10] : float32
0.5
ID:3, ID:5, ...

FIG. 16A correct / incorrect determination result confirmation specify target information (1) configure period [configure]

○○/○○/○○ ××:××:××

~

○○/○○/○○ ××:××:××

Figure 16A:
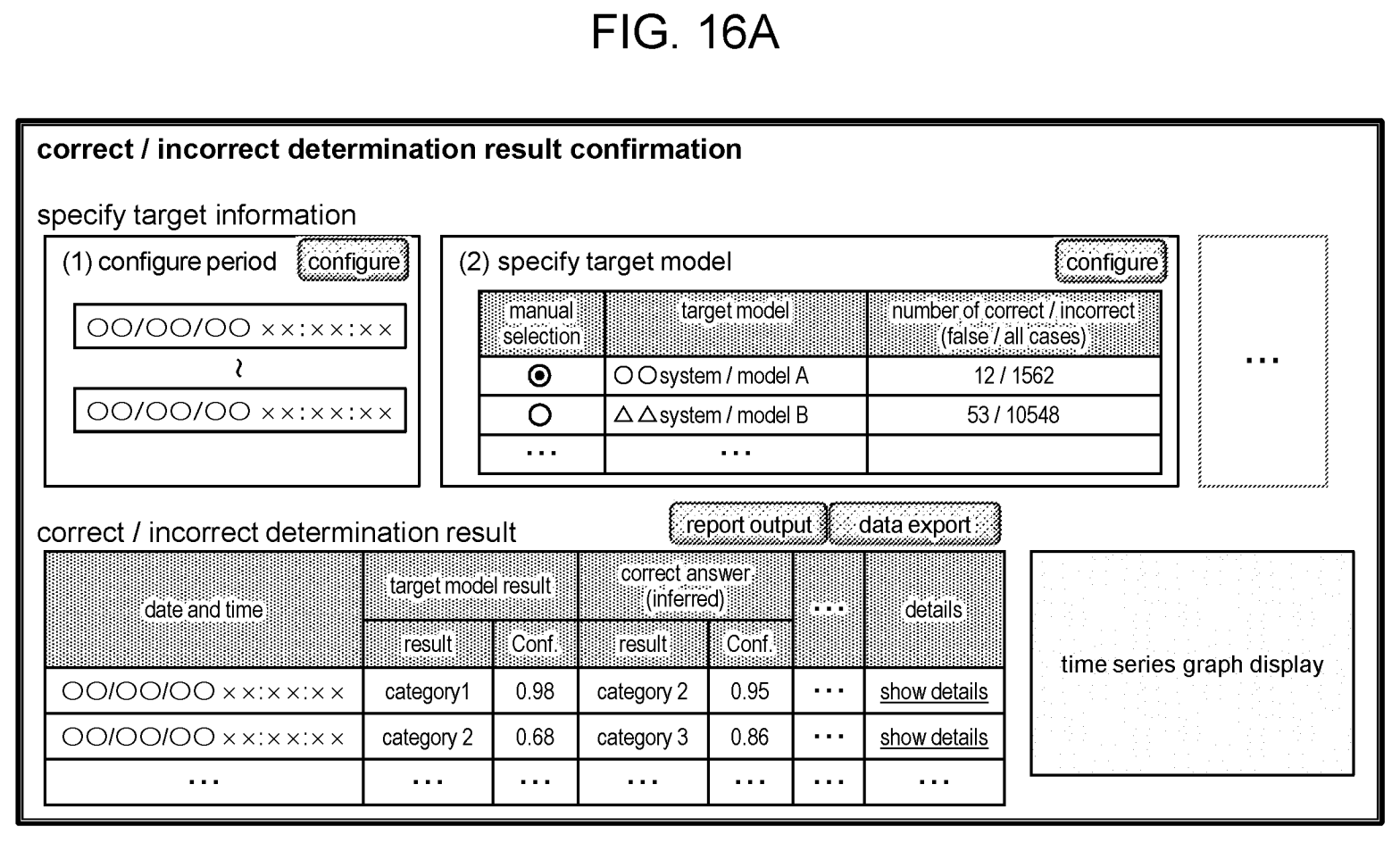

(2) specify target model [configure]

| manual selection | target model | number of correct / incorrect (false / all cases) |
|---|---|---|
| ◉ | ○○system / model A | 12 / 1562 |
| ○ | △△system / model B | 53 / 10548 |
| ... | ... | |

...

correct / incorrect determination result [report output] [data export]

| date and time | target model result | | correct answer (inferred) | | ... | details |
|---|---|---|---|---|---|---|
| | result | Conf. | result | Conf. | | |
| ○○/○○/○○ ××:××:×× | category1 | 0.98 | category 2 | 0.95 | ... | show details |
| ○○/○○/○○ ××:××:×× | category 2 | 0.68 | category 3 | 0.86 | ... | show details |
| ... | ... | ... | ... | ... | ... | ... |

time series graph display

AI QUALITY MONITORING SYSTEM

TECHNICAL FIELD

The present disclosure relates to a technique for monitoring quality of learning model included in AI.

BACKGROUND ART

Recently, AI (Artificial Intelligence) is actively used in the field of image recognition. For example, AI is used in an application such as recognizing a person existing in an image captured by a monitoring camera. The learning model of AI is created by performing machine learning process using learning data before launching the AI.

The quality of learning model varies over time. This us because the data itself inputted to the learning model may vary over time, thereby outdating the learning model constructed when launching the AI. Therefore, in order to maintain and improve the operational quality of the system using the AI even after launching the system, it is important to monitor the quality of the learning model.

In order to monitor the quality of the learning model, input data, intermediate data, or output data may be monitored. Hereinafter, monitoring the output data will be mentioned. When monitoring the output data, it is monitored whether a correct answer is outputted with respect to the input data. In the learning process, the learning proceeds using a pair of input data and correct answer data. Since there is no correct answer data in the operational stage of the AI, it is impossible to acquire correct answer data necessary for monitoring the output data. Therefore, when operating the AI, it is highly likely that the error of output data can be hardly found.

When it is difficult to find error of output data, conventional techniques typically determine whether output error is occurring, by manually viewing the output result every time, or by using parameters such as confidence (an indicator representing a statistical measure showing how much the output result is certain. This parameter is calculated within the learning model).

Patent Literature 1 below describes a technical problem as: "In a technique for evaluating validity of machine learning model, acquiring an evaluation result that is not affected by reliability of test data". Patent Literature 1 also describes a technique as: "A learning model evaluator comprises: an acquirer that acquires a machine learning model created from big data and also acquires a compared model created by a machine learning method same as that of the machine learning model from data for a part of variables which have relatively low importance among the big data; an evaluator that evaluates a validity of the machine learning model by comparing a prediction accuracy of the machine learning model and a prediction accuracy of the compared model" (refer to ABSTRACT).

CITATION LIST

Patent Literature

Patent Literature 1: JP 2021-009618 A

SUMMARY OF INVENTION

Technical Problem

It requires too much time and effort to manually view whether the output data is correct. Therefore, such manual viewing is not desirable in terms of efficiency. On the other hand, parameters such as confidence depend on the AI model used or on the input data. Therefore, such parameters are not correct in some cases. For example, if the learning model stores incorrect learning result, the confidence represents how much the input data is correct on the assumption of the incorrect learning result. Therefore, the confidence does not appropriately represent whether the output data is correct answer.

Patent Literature 1 creates a compared model from a part of big data having relatively low importance, thereby setting the prediction accuracy of the compared model at low level, and then uses the compared model to evaluate validity of the learning model (refer to paragraph 0009 of Patent Literature 1). In other words, the compared model in Patent Literature 1 is not always equivalent to the learning model to be evaluated in terms of validity. If it is possible to previously prepare a compared model equivalent to the learning model to be evaluated, it may be possible to more appropriately evaluate performance of the learning model.

The present disclosure is made in the light of the technical problem above. The objective of the present disclosure is to provide a technique capable of efficiently monitoring quality of learning model without depending on input data.

Solution to Problem

An AI quality monitoring system according to the present disclosure acquires an inferred result acquirable from a compared model inferring with respect to input data of same type as learning data learned by a learning model, and then compares the inferred result acquired from the compared model with correct answer data, thereby calculating an evaluation value representing how much the compared model is appropriate for determining quality of the learning model.

Advantageous Effects of Invention

According to the AI quality monitoring system of the present disclosure, it is possible to efficiently monitor quality of learning model without depending on input data. Other configurations, technical problems, advantages, or the like of the present disclosure will be apparent from referring to embodiments below.

BRIEF DESCRIPTION OF DRAWINGS

FIG. 8 is an example of user interface used by a user in S601.

FIG. 9A is an example of user interface presented on the operation terminal 30 in S704.

FIG. 9B is an example of user interface presented on the operation terminal 30 in S704.

FIG. 12 is an example of data stored in a selection result managing DB 231.

FIG. 16A is an example of user interface presented on the operation terminal 30 in S1501-S1502.

DESCRIPTION OF EMBODIMENTS

Figures 1, 2:
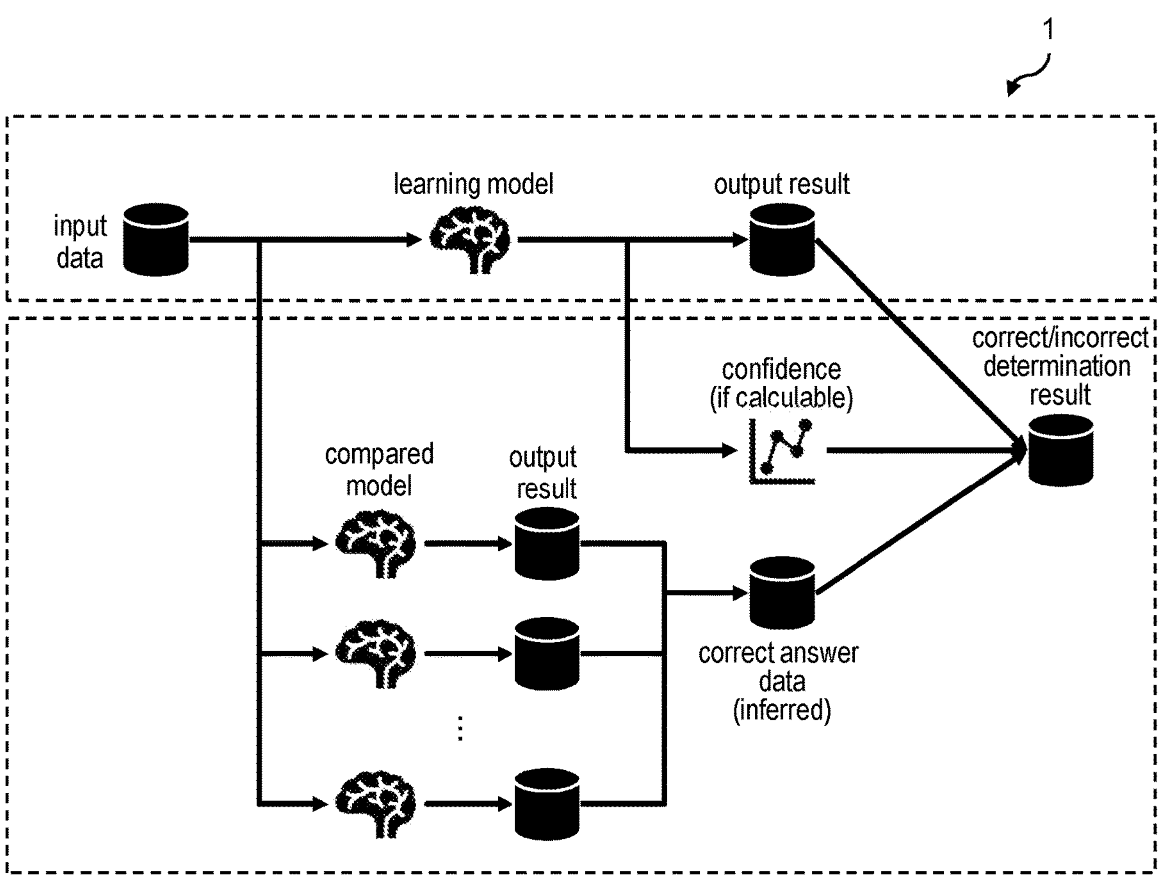
FIG. 1 is a conceptual diagram of an AI quality monitoring system 1.
FIG. 2 is a configuration diagram of a subsystem configuring the AI quality monitoring system 1.

FIG. 1 is a conceptual diagram of an AI quality monitoring system 1 according to an embodiment of the present disclosure. The AI quality monitoring system 1 is a system that monitors quality of a learning model. The AI quality monitoring system 1 uses a compared model for monitoring quality of the learning model. The compared model is another learning model that receives input data having a same format as that of the learning model, and that outputs output data having a same content as that of the learning model.

The AI quality monitoring model 1 infers correct answer data by comparing each one of output data outputted from each compared model. The AI quality monitoring system 1 compares the output data from the learning model with its correct answer data, thereby determining whether the output data from the learning model is correct/incorrect. Accordingly, it is possible to monitor quality of the learning model. If a confidence is acquirable about the output data of the learning model, the correct/incorrect determination may be performed using such confidence supplementarily. The quality of the learning model is determined using the output data from the compared model, thereby it is possible to monitor the quality of the learning model without depending on the learning model or on the input data.

The compared model is selected from previously constructed other learning models that are appropriate for evaluating the learning model to be monitored, under predetermined selecting conditions. In other words, when selecting the compared model, it is not necessary to depend on manual works. Therefore, it is possible to efficiently monitor quality of the learning model. Specific selection procedure will be described later.

The learning model is constructed in compliance with data format of the input data. For example, in a case of learning model that identifies specific shapes in images, the learning model typically implements such as identifying filters unique to the data format such as color space of the image or color depth of the image. Therefore, a model is appropriate for the compared model if the model uses input data format same as that of the learning model.

The result inferred by the learning model is described in a format in compliance with the target inferred by the learning model. For example, in a case of learning model that identifies whether the input data is an image of dog, the learning model is constructed so as to output "1" if the input image is dog and "0" for other cases, for example. It is desirable that such content of output data is at least partially common between the learning model whose quality is to be evaluated and the compared model. This is because it is difficult to compare learning models that respectively infer or output completely different contents from each other. Therefore, a model is appropriate for the compared model that outputs output data contents same as those of the learning model.

FIG. 2 is a configuration diagram of a subsystem configuring the AI quality monitoring system 1. The AI quality monitoring system 1 is configured by a correct/incorrect determining system 10, a monitoring system 20, and an operation terminal 30, The correct/incorrect determining system 10 determines a quality of the learning model using the method explained in FIG. 1, for the learning model of AI used in a system that uses the AI (AI using system). This determination may be referred to as correct/incorrect determination. The correct/incorrect determining system 10 may be provided in the monitoring system 20, or may be provided in the AI using system as long as there is no problem in terms of processing load. The correct/incorrect determining system 10 is typically installed at a place (onsite) where the AI using system works.

The monitoring system 20 centrally monitors the learning models used by each of the AI using systems. The monitoring system 20 also selects the compared models used for the correct/incorrect determining system 10 to perform correct/incorrect determination. The monitoring system 20 typically is installed on a cloud system apart from the onsite place. However, the installation place is not limited to it. The monitoring system 20 may be installed in the onsite place, in the monitoring site described later, or the like.

The operation terminal 30 is used by a user to view a result created by the monitoring system 20 monitoring qualities of each learning model. The operation terminal 30 is installed in a monitoring site remotely accessing the monitoring system 20. However, the installation place is not limited to it. The operation terminal 30 may be installed in the onsite place, for example.

On the operation terminal 30, a user sets various parameters used in the process evaluating the quality of the learning model ((1) configurations). The configuration is registered in the monitoring system 20 and in the correct/incorrect determining system 10 ((2) model/parameter registration). The correct/incorrect determining system 10 collects input data that is inputted to the learning model and to the compared model respectively ((3) data collection). The correct/incorrect determining system 10 sends, to the monitoring system 20, the correct/incorrect determination result determined for outputs of the learning model ((4) correct/incorrect determination result). The user views the result ((5) view result). According to the procedure above, the user can monitor the quality of the learning model. Details of each step will be described later.

Figure 3:
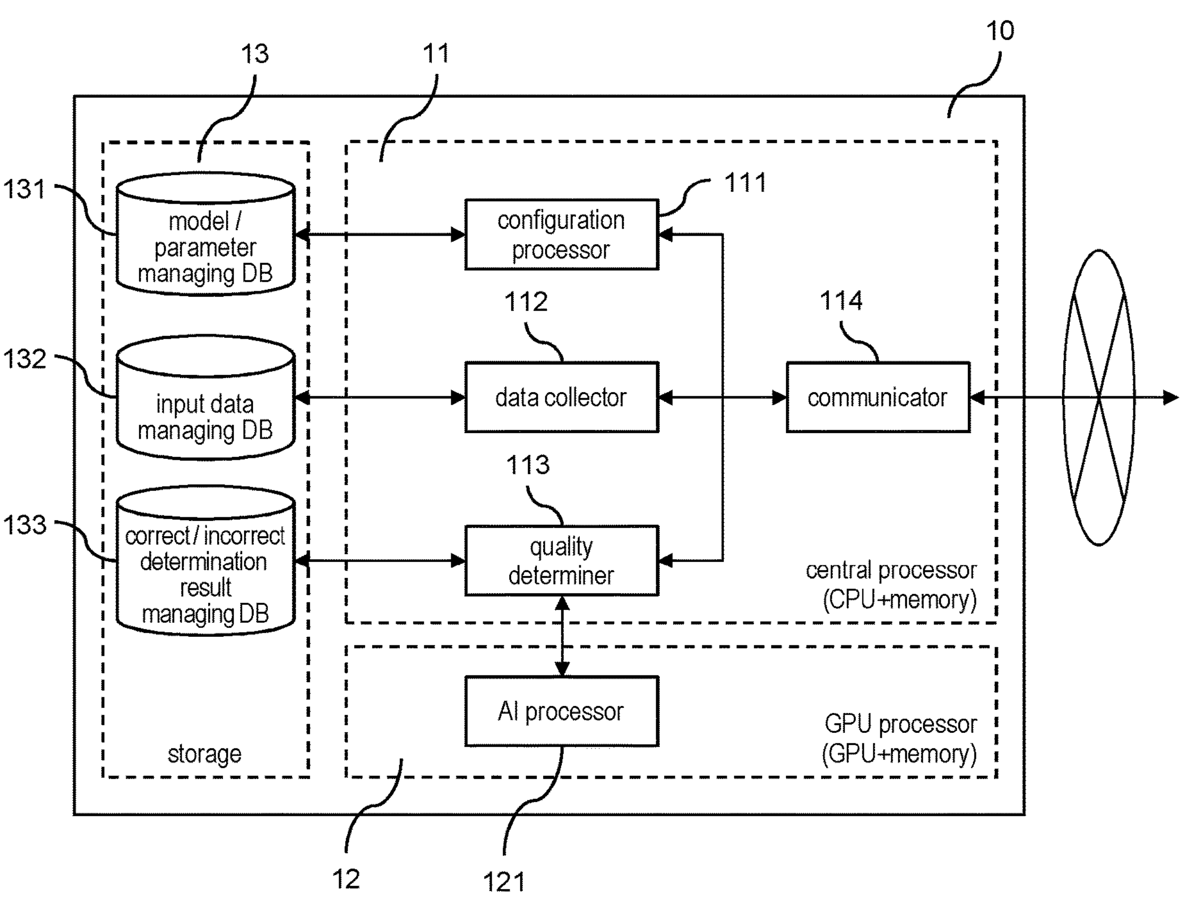
FIG. 3 is a configuration diagram of a correct/incorrect determining system 10.

FIG. 3 is a configuration diagram of the correct/incorrect determining system 10. The correct/incorrect determining system 10 includes a central processor 11, a GPU (Graphics Processing Unit) processor 12, and a storage 13.

The central processor 11 is configured by, for example, a processor such as CPU (Central Processing Unit) and a memory. The central processor 11 includes a configuration processor 111, a data collector 112, a quality determiner 113, and a communicator 114. Details of those functional units will be described later.

The GPU processor 12 is configured by another processor (e.g. GPU) separate from the central processor 11, and by a memory. The GPU processor 12 includes an AI processor 121. The AI processor 121 performs inferring process using the learning model or the compared model. This inferring process often requires high processing load. Therefore, this embodiment installs a GPU in addition to the central processor 11, and the GPU performs the inferring process. However, as long as the processing load is acceptable, the AI processor 121 may be included in the central processor 11.

The storage 13 may be configured by a storage device that stores data. The storage 13 stores a model/parameter managing database (DB) 131, an input data managing DB 132, and a correct/incorrect determination result managing DB 133. Details of those databases will be described later.

Figure 4:
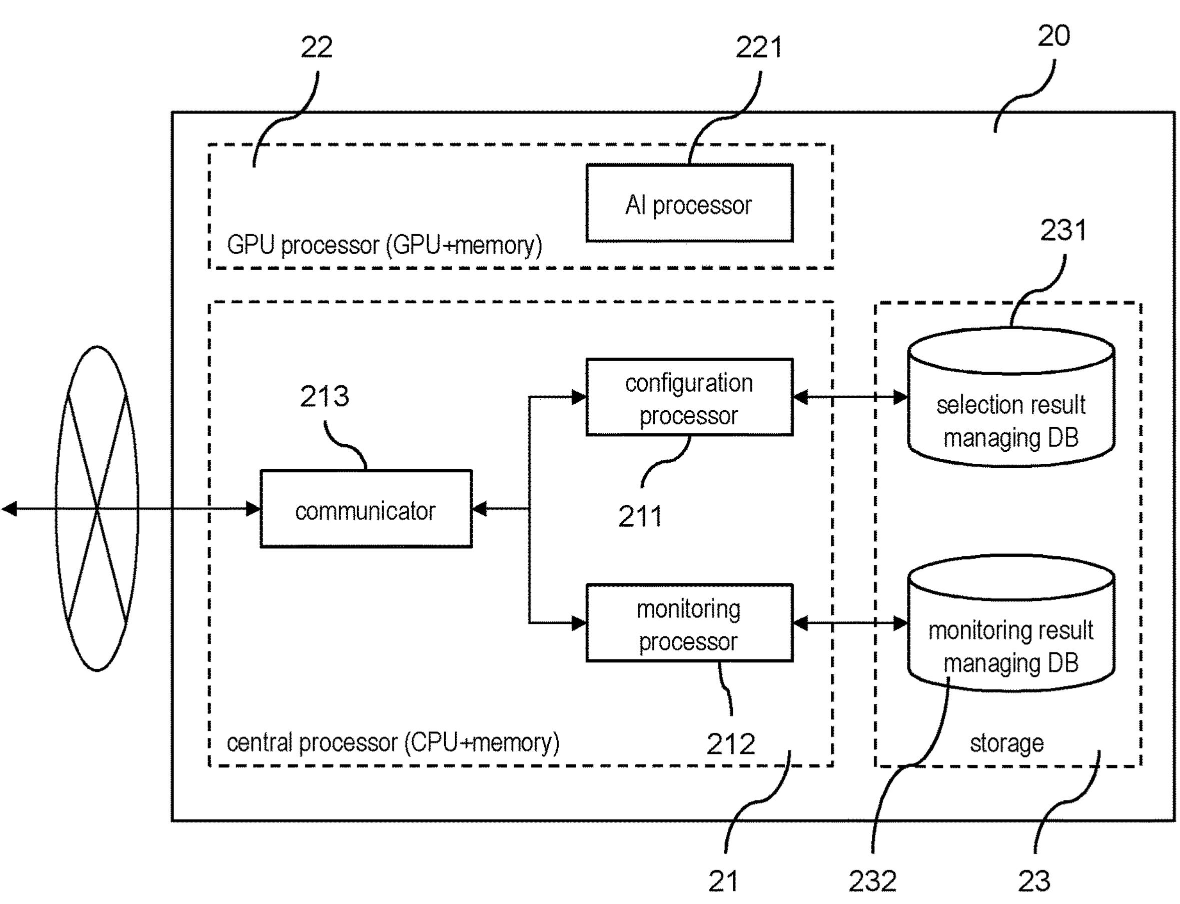
FIG. 4 is a configuration diagram of a monitoring system 20.

FIG. 4 is a configuration diagram of the monitoring system 20. The monitoring system 20 includes a central processor 21, a GPU processor 22, and a storage 23.

The central Processor 21 is configured by, for example, a processor such as CPU and a memory. The central processor 21 includes a configuration processor 211, a monitoring processor 212 (compared model selector), and a communicator 213. Details of those functional units will be described later.

The GPU processor 22 is configured by another processor (e.g. GPU) separate from the central processor 21, and by a memory. The GPU processor 22 includes an AI processor 221. The AI processor 221 performs inferring process using the learning model or the compared model. The correct/incorrect determining system 10 also has the AI processor 121. There is a difference between the correct/incorrect determining system 10 and the monitoring system 20 in that the correct/incorrect determining system 10 uses the AI processor 121 when performing correct/incorrect determination process for the learning model, whereas the monitoring system 20 uses the AI processor 221 when selecting the compared model. As for the AI processor 121, the AI processor 221 may be included in the central processor 21.

The storage 23 may be configured by a storage device that stores data. The storage 23 stores a selection result managing DB 231 and a monitoring result managing DB 232. Details of those databases will be described later.

Figure 5:
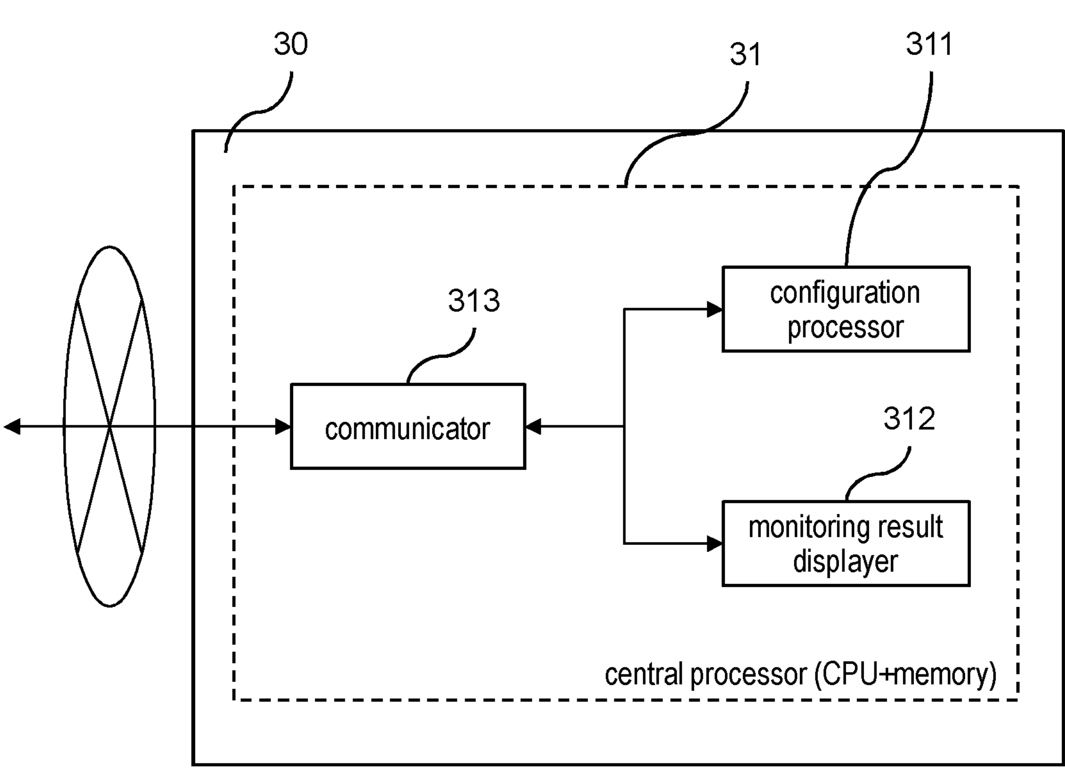
FIG. 5 is a configuring diagram of an operation terminal 30.

FIG. 5 is a configuring diagram of the operation terminal 30. The operation terminal 30 includes a central processor 31. The central processor 31 is configured by, for example, a processor such as CPU and a memory. The central processor 31 includes a configuration processor 311, a monitoring result displayer 312, and a communicator 313. Details of those functional units will be described later.

Figure 6:
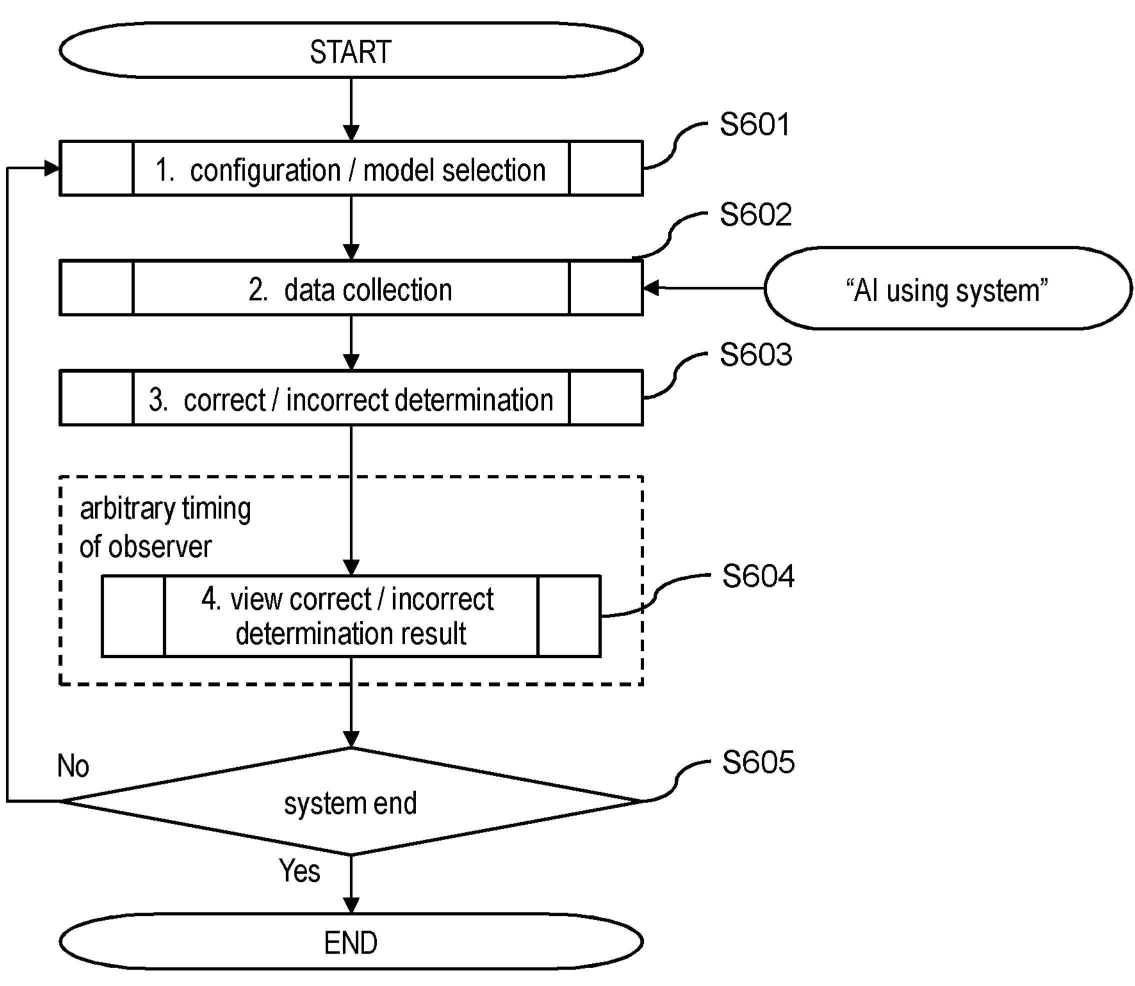
FIG. 6 is a flowchart explaining a behavior of the AI quality monitoring system 1.

FIG. 6 is a flowchart explaining a behavior of the AI quality monitoring system 1. Details of each step will be described later in subsequent flowcharts. This flowchart describes overall behavior of the AI quality monitoring system 1.

(FIG. 6: Step S601)

On the operation terminal 30, a user specifies parameters used in the process for selecting the compared model. An example of user interface will be described later. The operation terminal 30 sends the specified content to the monitoring system 20. The monitoring system 20 stores the specified content into the selection result managing DB 231. The monitoring system 20 selects a compared model according to the specified parameters. The correct/incorrect determining system 10 stores information about the compared model selected by the monitoring system 20 into the model/parameter managing DB 131.

(FIG. 6: Step S602)

The correct/incorrect determining system 10 collects input data that is inputted to the learning model whose quality is to be evaluated. The correct/incorrect determining system 10 stores the collected input data into the input data managing DB 132.

(FIG. 6: Step S603)

The correct/incorrect determining system 10 inputs the input data collected in S602 into the learning model and into the compared model respectively. The correct/incorrect determining system 10 performs correct/incorrect determination for the output data acquired from the learning model as a result of inputting the collected input data. The correct/incorrect determining system 10 sends the correct/incorrect determination result to the monitoring system 20.

(FIG. 6: Step S604)

The monitoring system 20 presents the correct/incorrect determination result in S603 to the operation terminal 30. The user views the correct/incorrect determination result on the operation terminal 30.

(FIG. 6: Step S605)

The user returns to S601 or S602 to perform same processes if necessary.

Figure 7:
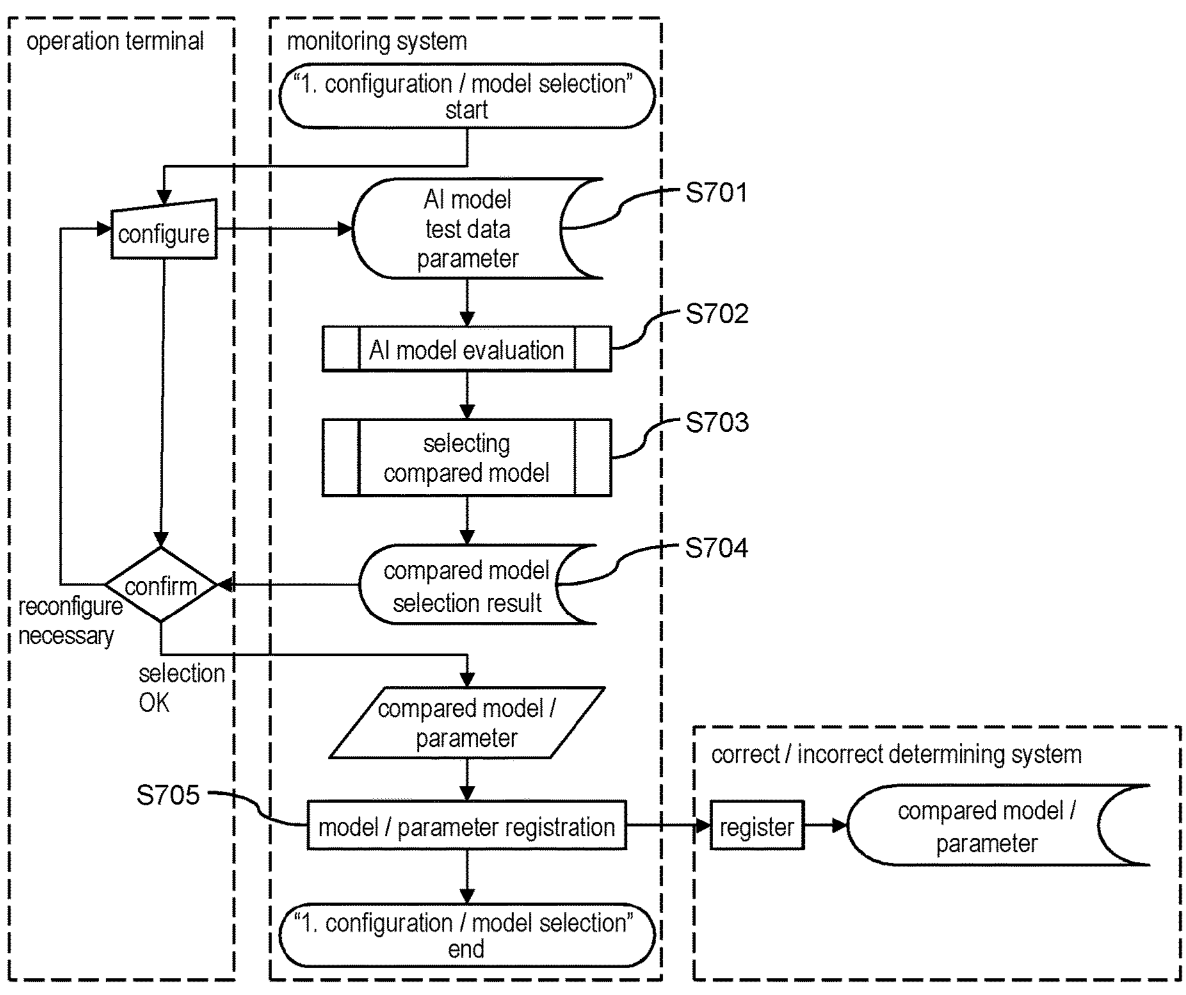
FIG. 7 is a flowchart explaining details of S601.

FIG. 7 is a flowchart explaining details of S601. Hereinafter, each step in FIG. 7 will be described.

(FIG. 7: Step S701)

On the operation terminal 30, a user specifies learning model, candidates of compared model, test data, and other parameters. On the operation terminal 30, the configuration processor 311 sends the specified content to the monitoring system 20 via the communicator 313. In the monitoring system 20, the configuration processor 211 receives the specified content via the communicator 213. The configuration processor 211 stores the specified content into the selection result managing DB 231.

(FIG. 7: Step S701: Additional Note No. 1)

The parameters specified by the user in this step include: (a) identifiers of learning model; (b) identifiers of compared model; (c) pair of input data and correct answer data; (d) various parameters such as information on the identified target, data format, etc.

(FIG. 7: Step S701: Additional Note No. 2)

The model selected by the user as the compared model includes: (a) past version of the learning model; (b) a model learned by changing hyper parameters; (c) a model learned by changing learning data; (d) a model learned for determining correct/incorrect.

(FIG. 7: Step S702)

The monitoring processor 212 evaluates how much the candidate for compared model is appropriate for evaluating the quality of the learning model according to the parameters specified in S701. Details of this step will be described later.

(FIG. 7: Step S703)

The monitoring processor 212 determines one or more employed compared models from the candidates for compared model according to the result of S702. Details of this step will be described later.

(FIG. 7: Step S704)

The monitoring processor 212 notifies the operation terminal 30 of the selected compared model. The user confirms the result on the operation terminal 30. If it is necessary to reselect the compared model, the user returns to S701 to reconfigure the parameters. If it is not necessary to reselect, the monitoring system 20 is notified about it. Then the flowchart proceeds to S705.

(FIG. 7: Step S705)

The configuration processor 211 sends the result of steps above to the correct/incorrect determining system 10. In the correct/incorrect determining system 10, the configuration processor 111 receives the processing result via the communicator 114. The configuration processor 111 stores the processing result into the model/parameter managing DB 131. For example, the model/parameter managing DB 131 stores identifiers of the selected compared model.

FIG. 8 is an example of user interface used by a user in S601. The user uses this interface to input parameters about learning model/compared model/selecting procedure.

Information on the learning model whose quality is to be evaluated is inputted into "evaluated target configuration" section. The inputted information includes such as: identifiers of learning model, format of input data, format of output data, datafile for recording learning model, etc.

Information on the compared model is inputted into "compared model configuration" section. The inputted information includes such as: number of models specified as compared model, maximum processing time when the compared model performs inferring process, etc. It is desirable to select, as a compared model, a model that uses an input data format same as that of the learning model and that outputs a content same as that of the learning model. Then for example, when selecting a datafile of compared model and pressing "add" button, the system may compare the input data format and the output content of the compared model with those of the learning model, and may output an alert message if the input data format and the output content do not match between the compared model and the learning model.

Information on the procedure for selecting the compared model and on evaluation indicators is inputted into "model selection configuration" section. A method may be used as the selecting procedure that evaluates correctness (degree of coincidence between inferred answer and correct answer) of correct/incorrect determination which is calculated from the inferred result by the compared model. In addition, the evaluation of compared model may include discrepancy (degree of detecting error of learning model) between inferred result of learning model and inferred result of compared model. FIG. 8 describes confusion matrix as an example. Accuracy, precision, recall, F measure, and the like may be an evaluation indicator for degree of coincidence. If the evaluation indicator is at or above an evaluation threshold, the compared model will be employed.

Each input section may present selectable options only. For example, when selecting a datafile of learning model, the dropdown list may only present options that are supported as input data format and output data format of the learning model.

FIG. 9A is an example of user interface presented on the operation terminal 30 in S704. In S703, one or more pairs of compared model are selected as candidates, and the selected compared models are presented on this screen. At this time, the evaluated result in S702 (such as evaluation value for each compared model pair) may also be presented. In this example, an evaluation value is calculated for each compared model pair using F measure, and the rank of the pair is presented in the descending order of the evaluation value.

FIG. 9B is an example of user interface presented on the operation terminal 30 in S704. This screen is presented when tracking details of each compared model pair in FIG. 9A from the link "show details". This screen presents, along with input data, inferred results of learning model and inferred results of compared model for each of compared models in compared model pairs. Confusion matrixes may also be presented that are created when calculating the evaluation indicators. Confidence may be presented for each inferred result.

Figure 10:
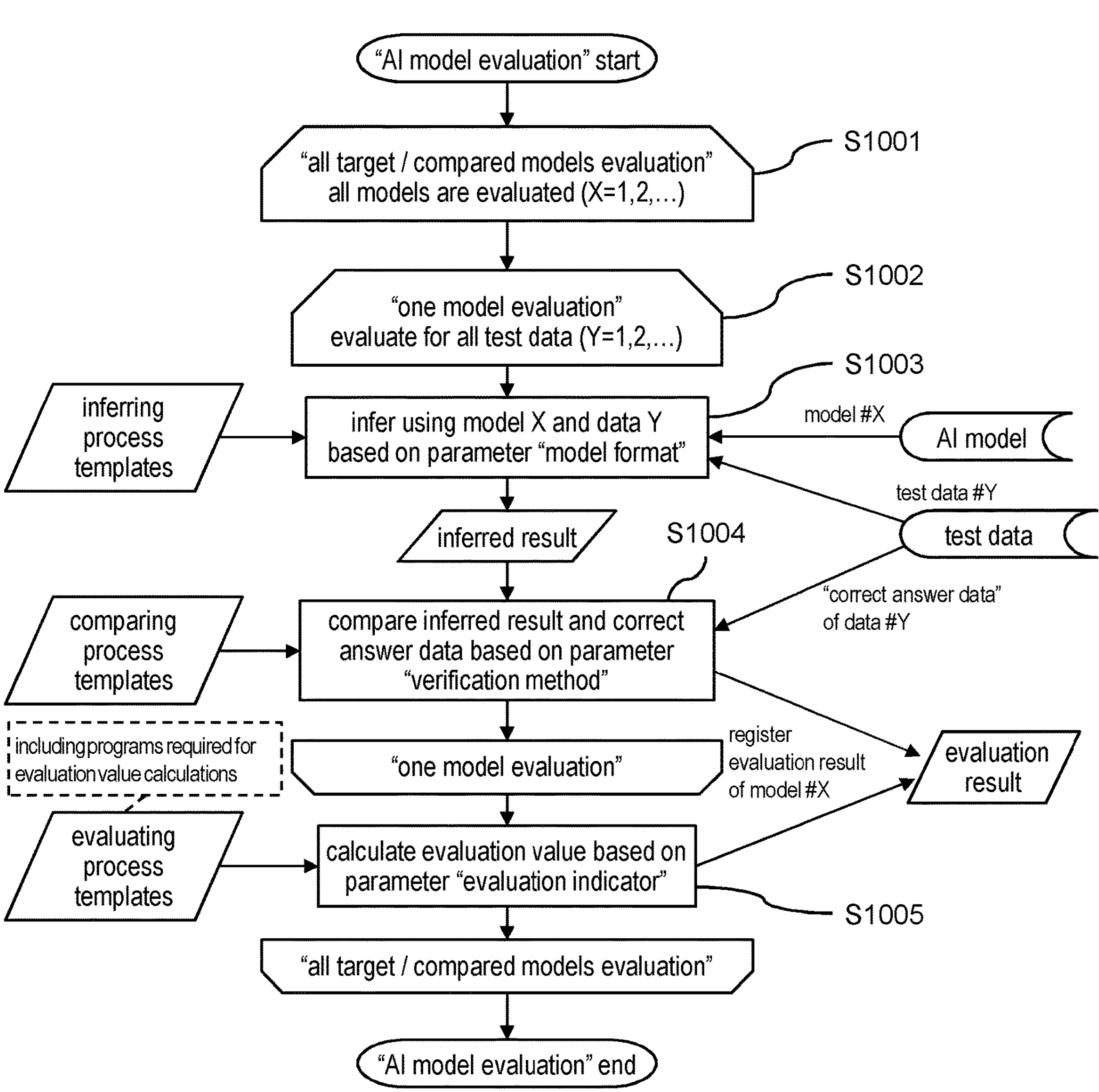
FIG. 10 is a flowchart explaining details of S702.

FIG. 10 is a flowchart explaining details of S702. Hereinafter, each step in FIG. 10 will be described.

(FIG. 10. Step S1001)

The monitoring processor 212 performs subsequent steps for each of one or more compared models, thereby calculating evaluation values for each compared model. The evaluation value in this step is an indicator that represents how much the compared model is appropriate for evaluating the quality of the learning model. The evaluation value is the one specified by the user in the interface of FIG. 8.

(FIG. 10: Step S1002)

The monitoring processor 212 performs, onto one compared morel X, S1003-S1004 for each of test data Y.

(FIG. 10: Step S1003)

The monitoring processor 212 performs inferring process using test data Y as input data for each of learning model and compared model specified by the user in the user interface of FIG. 8. If the user also specifies the test data Y, the specified test data is used. The test data and the correct answer data are paired. The actual portion of inferring process may be delegated to the AI processor 221.

(FIG. 10: Step S1003: Additional Note)

The data recording the learning data describes learned result, and may not describe inferring behavior performed by the learned result (it also applies to the compared model). For example, in a case of neural network, the learning model is constructed as describing a learned result for connection relationships between neurons. Therefore, in order to perform inferring behaviors, an inferring process template may be additionally required describing such inferring behaviors. In such cases, the monitoring processor 212 performs this step using an inferring process template corresponding to the learning model. The inferring process template is prepared in advance for each learning model. The implementation format of the inferring process template may be combinations of AI framework, runtime library, submodule, executable file, and the like.

(FIG. 10: Step S1004)

The monitoring processor 212 compares, with correct answer data Y, an inferred result by the learning model and an inferred result by the compared model, according to the selecting method specified by the user in the user interface of FIG. 8. For example, they are compared with each other by creating a confusion matrix. A process template corresponding to the selecting method specified by the user is prepared in advance as in the case of inferring process. The prepared processing template is used to perform the comparing process. The compared result is stored into the selection result managing DB 231 as a list of each element in the confusion matrix and an inferring process duration.

(FIG. 10: Step S1005)

The monitoring processor 212 calculates an evaluation value of the compared model according to the evaluation indicator specified by the user in the user interface of FIG. 8. A process template corresponding to the evaluation indicator specified by the user is prepared in advance as in the case of inferring process. The prepared processing template is used to perform the evaluation process. The evaluation result is stored into the selection result managing DB 231 along with the comparing result.

Figure 11:
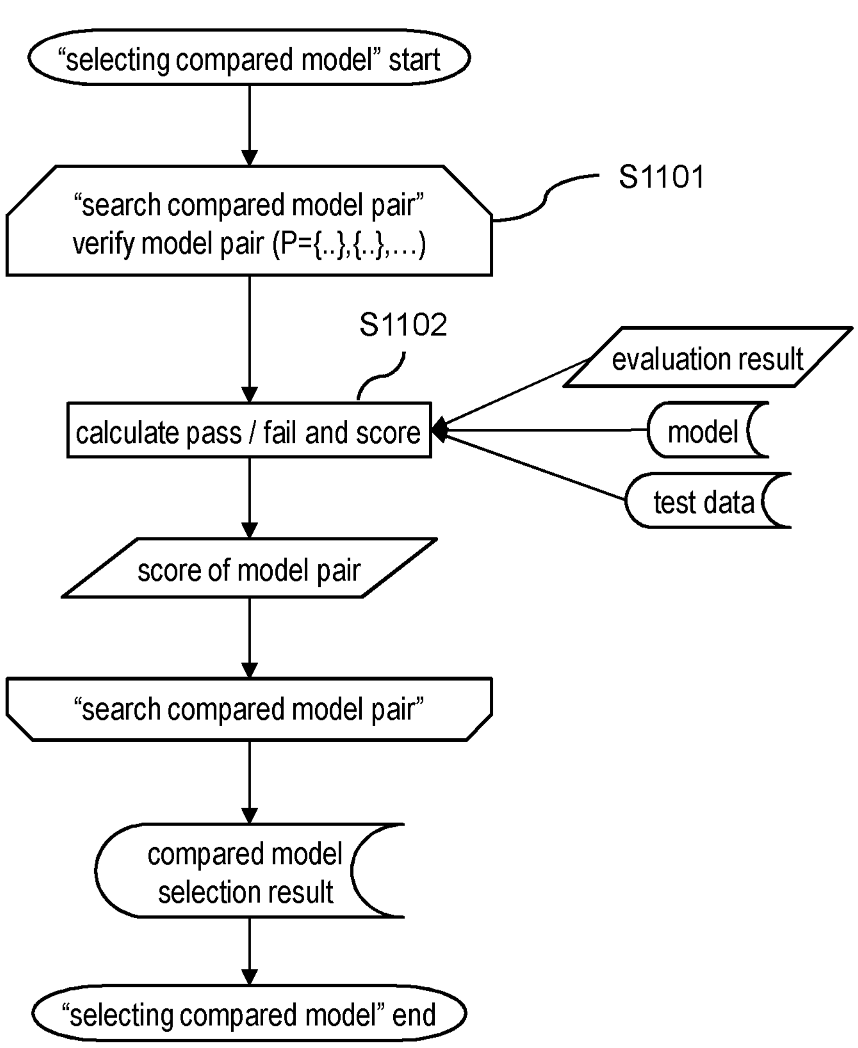
FIG. 11 is a flowchart explaining details of S703.

FIG. 11 is a flowchart explaining details of S703. Hereinafter, each step in FIG. 11 will be described.

(FIG. 11: Step S1101)

The monitoring processor 212 performs S1102 for each of combination of one or more compared models (compared model pair). For example, S1102 may be performed for all combinations of compared models. Alternatively, an appropriate searching algorithm may be used to narrow the combination scope in advance.

(FIG. 11: Step S1101: Additional Node)

The number of compared models forming one combination is within the scope (model pair number limit) specified by the user in the user interface of FIG. 8. The compared model pair is configured such as {A, B, C}, {A, B, D}, . . . , {A, D, E, F}, . . . , etc.

(FIG. 11: Step S1102)

The monitoring processor 212 calculates a score of compared model pair. The score in this step is a statistical amount such as average of evaluation values of each compared model in the compared model pair. The score is not limited to such definition. For example, an evaluation value may be calculated considering other parameters such as inferring process duration. As a result of this step, as shown in lower portion of FIG. 9A, a score is calculated for each of compared model pairs. A pair having a best score may be selected. Alternatively, all compared model pairs are presented to the user as selected result and then the user selects any one from the presented pairs.

FIG. 12 is an example of data stored in the selection result managing DB 231. The configuration processor 211 reads out such as options on the user interface from this data, and presents them to the operation terminal 30. The monitoring processor 212 stores the selected compared model into the selection result managing DB 231, and notifies the stored content to the correct/incorrect determining system 10. In the correct/incorrect determining system 10, the model/parameter managing DB 131 stores the notified content. The lowest portion in FIG. 12 corresponds to the stored content.

Figure 13:
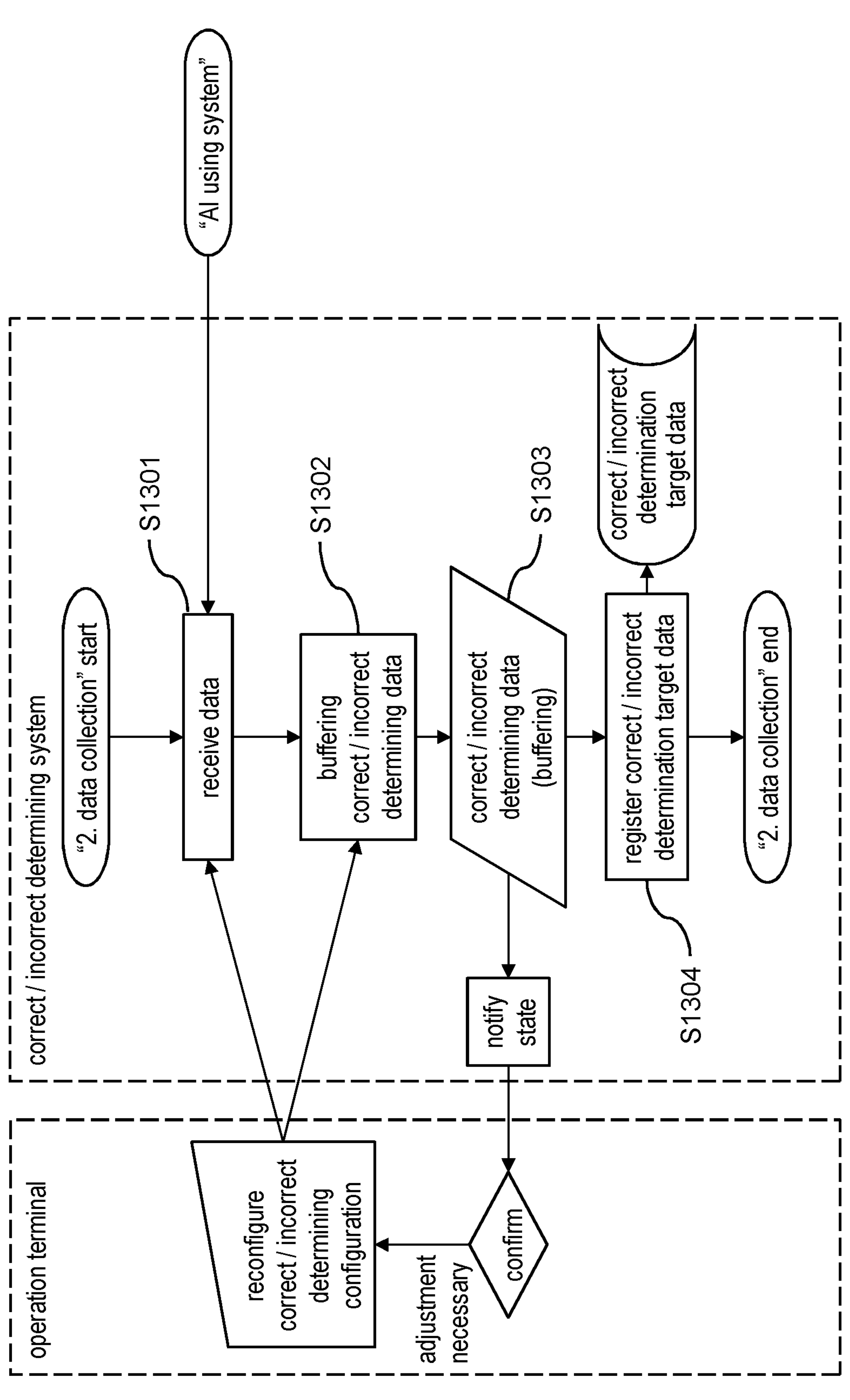
FIG. 13 is a flowchart explaining details of S602.

FIG. 13 is a flowchart explaining details of S602. Hereinafter, each step in FIG. 13 will be described. The communication between the correct/incorrect determining system 10 and the operation terminal 30 may be via the monitoring system 20, or the correct/incorrect determining system 10 and the operation terminal 30 may communicate with each other directly.

(FIG. 13: Step S1301-S1302)

The data collector 112 collects input data (this data is referred to as correct/incorrect determining data because this data is used for correct/incorrect determination of inferred result by learning model) used by the learning model whose quality is to be evaluated (S1301). The data collector 112 temporally stores the input data into the input data managing DB 132 (S1302). The input data may be collected from the AI using system or may be collected from other appropriate data sources. In order to compare with "correct answer data (inferred)" from the compared model, the output data (such as output result or confidence) from the learning model may also be collected.

(FIG. 13: Step S1303)

The data collector 112 notifies the operation terminal 30 of the process collecting the input data. For example, the number of or the amount of collected data pieces may be notified. The user confirms the notification on the operation terminal 30. The user then determines whether it is necessary to reconfigure the collecting condition. If the input data is recollected, the collecting condition is notified to the data collector 112, and then the flowchart returns to S1301. If the input data is not recollected, the flowchart proceeds to S1304. For example, if the input data managing DB 132 is about to overflow, the collecting condition may be reconfigured.

(FIG. 13: Step S1304)

The data collector 112 finalizes (registers) the input data that is temporally stored into the input data managing DB 132. If the input data is stored into a temporal memory in S1302, the finalized input data is copied to the input data managing DB 132.

Figure 14:
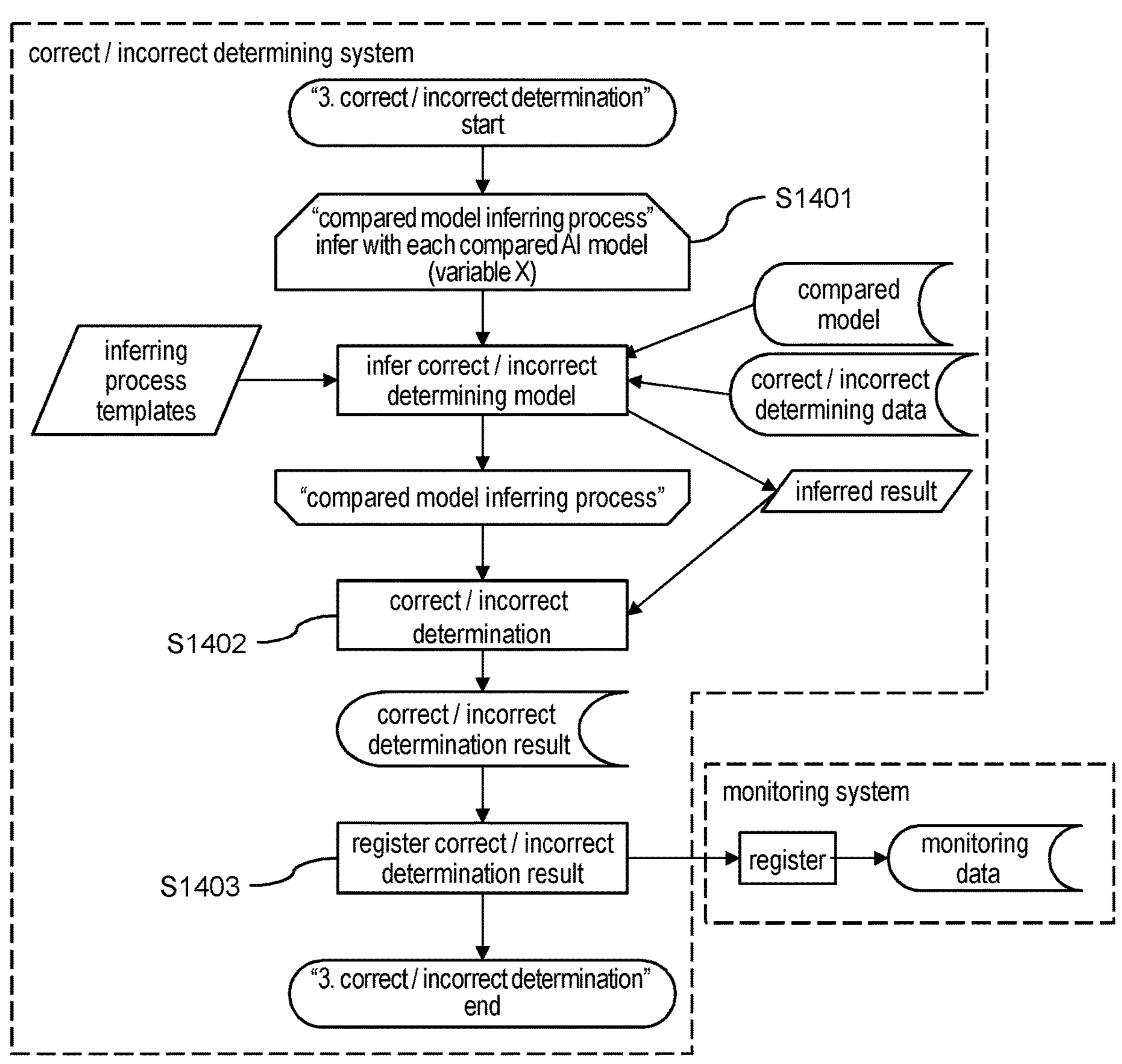
FIG. 14 is a flowchart explaining details of S603.

FIG. 14 is a flowchart explaining details of S603. After the monitoring system 20 determines the compared model, S603 is performed using the determined compared model. Hereinafter, each step in FIG. 14 will be described.

(FIG. 14: Step S1401)

The quality determiner 113 inputs the input data into each compared model in the compared model pair, thereby performing inferring process. The actual portion of inferring process may be delegated to the AI processor 121. The inferring process templates are prepared in advance as in S1003.

(FIG. 14: Step S1402)

The quality determiner 113 compares inferred results of each compared model, thereby inferring correct answer data. The quality determiner 113 compares the inferred correct answer data with the inferred result by the learning model, thereby determining whether the inferred result by the learning model is correct/incorrect. The quality determiner 113 stores the determination result into the correct/incorrect determination result managing DB 133.

(FIG. 14: Step S1403)

The quality determiner 113 forwards, to the monitoring system 20, the correct/incorrect determination result in S1402 and the input data. The monitoring system 20 registers the correct/incorrect determination result into the monitoring result managing DB 232. A part of information may be restricted from being registered according to the parameters configured by the user on the user interface of FIG. 8.

Figure 15:
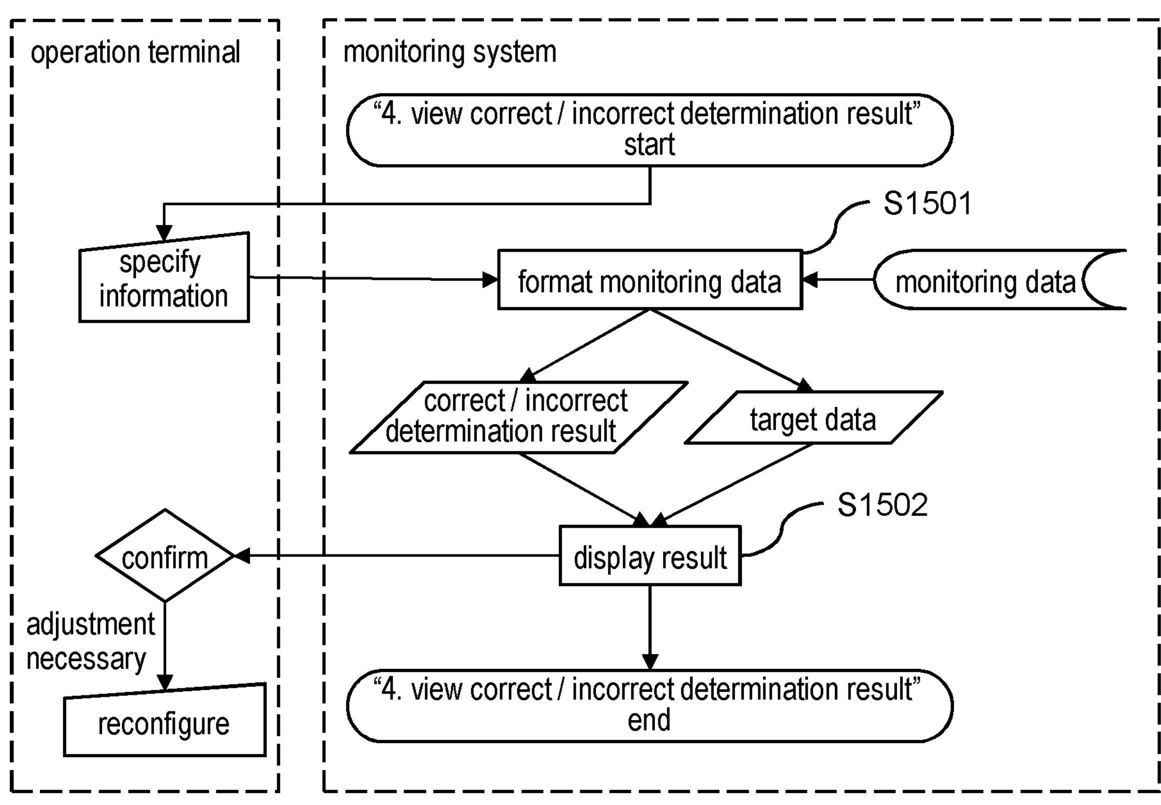
FIG. 15 is a flowchart explaining details of S604.

FIG. 15 is a flowchart explaining details of S604. Hereinafter, each step in FIG. 15 will be described.

(FIG. 15: Step S1501)

On the operation terminal 30, the user inputs conditions such as learning model or evaluation period. The configuration processor 211 acquires, from the monitoring result managing DB 232, correct/incorrect determination results (monitoring data) matching with the condition. The configuration processor 211 formats the acquired correct/incorrect determination result into a format that is easily viewable by the user. For example, the correct/incorrect determination result may be formatted by graph format, list format, being sorted in the descending order of evaluation value, etc.

(FIG. 15. Step S1502)

The configuration processor 211 presents the formatted correct/incorrect determination result on the operation terminal 30. The user confirms the correct/incorrect determination result. The user determines whether it is necessary to readjust such as compared model pairs. If it is necessary to readjust, the flowchart of FIG. 6 will be performed again.

FIG. 16A is an example of user interface presented on the operation terminal 30 in S1501-S1502. Target period or learning model for confirmation of determination result is inputted into "specify target information" section. "correct/incorrect determination result" section displays correct/incorrect determination results matching with specified conditions. By pressing "data export" button, the data describing correct/incorrect determination result will be outputted as a report data in an appropriate format. By pressing "report output" button, the correct/incorrect determination result will be collected to be displayed in a format such as list. Both data may be configured to be downloadable via network onto a computer used by the user.

Figure 16B:
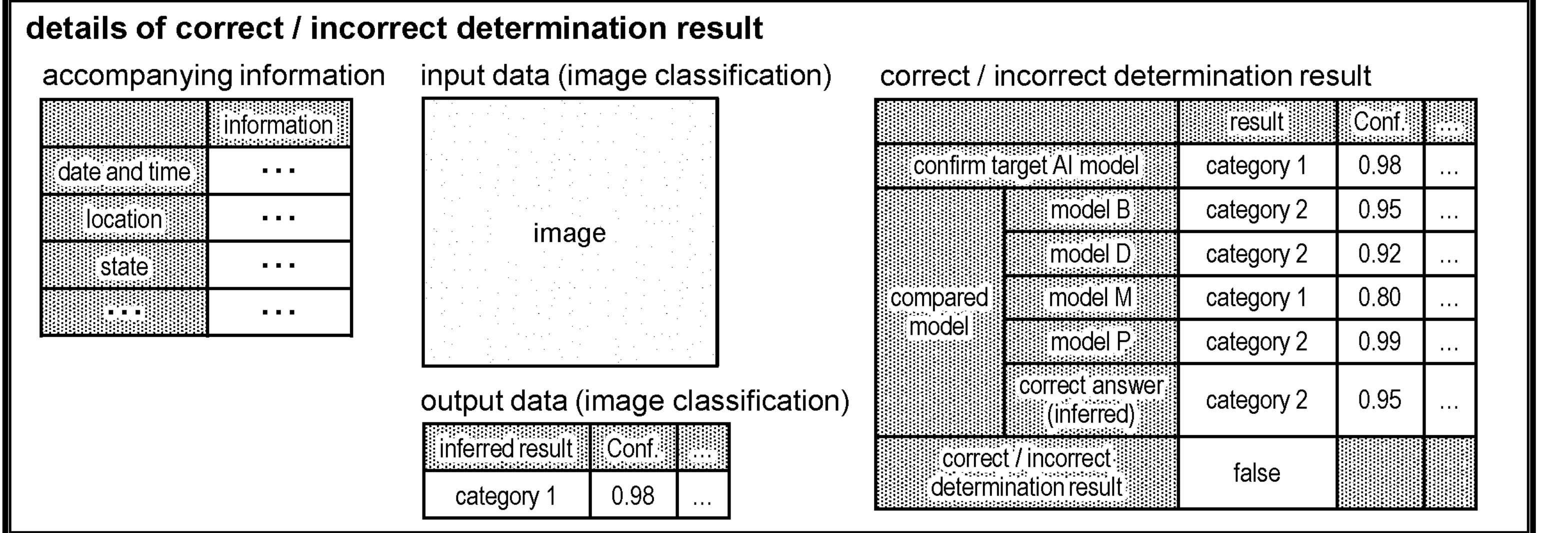
FIG. 16B is an example of user interface presented on the operation terminal 30 in S1501-S1502.

FIG. 16B is an example of user interface presented on the operation terminal 30 in S1501-S1502. By clicking "show details" link in FIG. 16A, this screen will be displayed. This screen displays correct/incorrect determination results or confidences for each of compared models in the compared model pair. Input data and correct answer data may also be presented.

<Modification of Present Disclosure>

In the embodiment above, it is desirable to select candidates for compared model whose data format match with the learning model at least in terms of below. (a) pixel size of input data (it is desirable if both vertical and horizontal sizes are identical between the compared model and the learning model); (b) color space of input data (such as RGB, YUV); (c) color depth of input data (number of bits used for representing one color component); (d) content of output data. If these formats match with each other, the learning model and the compared model both use a same type input data, and the contents of output data are identical to each other.

In the embodiment above, the inferred results by the compared models are compared to each other, thereby inferring correct answer data (refer to FIG. 1). However, as long as correct answer data can be acquired separately, the acquired correct answer data may be used along with the inferred results. For example, during operation, some input data may be inputted whose correct answer data is known in advance. In such cases, instead of or along with the inferred result by the compared model, such correct answer data may be used. For example, a weighted result between both data may be used as correct answer data. In both cases where correct answer data is given or where correct answer data is inferred, the inferred result of learning model is compared with correct answer data.

In the embodiment above, two or more of the correct/incorrect determining system 10, the monitoring system 20, or the operation terminal 30 may be integrated with each other. In such case, the central processors will be integrated to each other or the GPU processors will be integrated to each other.

In the embodiment above, functional units included in each system may be configured by hardware such as circuit implementing the functionalities of the functional units, or may be configured by software implementing the functionalities of the functional units executed by processors. In the correct/incorrect determining system 10, the configuration processor 111, the data collector 112, the quality determiner 113, the communicator 114, and the AI processor 121 correspond to such functional units. In the monitoring system 20, the configuration processor 211, the monitoring processor 212, the communicator 213, and the AI processor 221 correspond to such functional units.

REFERENCE SIGNS LIST

1: AI quality monitoring system
10: correct/incorrect determining system
20: monitoring system
30: operation terminal

The invention claimed is:

1. An AI quality monitoring system that monitors quality of a learning model included in an AI, comprising:

a compared model selector that selects a compared model used for determining quality of the learning model;

a quality determiner that determines quality of the learning model by comparing an inferred result by the learning model with an inferred result by the compared model selected by the compared model selector; and an outputter that outputs a determination result by the quality determiner, wherein the compared model selector acquires, for each of one or more of the compared model, an inferred result acquired by the compared model performing inferring process on input data that has same type as learning data learned by the learning model, wherein the compared model selector compares an inferred result acquired from the compared model with correct answer data, thereby calculating, for each of the compared morel, an evaluation value that represents how much the compared model is appropriate for determining quality of the learning model, and wherein the compared model selector selects one or more of the compared model according to the evaluation value.

2. The AI quality monitoring system according to claim 1, wherein the compared model selector compares an inferred result by the compared model with the correct answer data to create a confusion matrix, and wherein the compared model selector calculates, as the evaluation value, at least one of a F measure of the confusion matrix, an accuracy of the confusion matrix, a precision of the confusion matrix, a recall of the confusion matrix, or a duration required by the compared model to perform inferring process.

3. The AI quality monitoring system according to claim 1, wherein the compared model selector creates a combination of one or more of the compared model, wherein the compared model selector calculates the evaluation value for each of the compared model in the combination, and wherein the compared model selector selects the compared model in the combination having a highest statistical amount of the evaluation value as most appropriate for determining quality of the learning model.

4. The AI quality monitoring system according to claim 1, the AI quality monitoring system further comprising an interface that is used by a user to specify a parameter used by the compared model selector when selecting the compared model, wherein the interface receives, as the parameter, a specifying input from the user that specifies at least one of:

information that identifies the learning model;

information that identifies the compared model;

a datatype of an inferred result outputted from the learning model;

a procedure for performing inferring process using the compared model;

a procedure for comparing an inferred result by the compared model with the correct answer data; or a procedure for calculating the evaluation value, and wherein the compared model selector selects the compared model using the parameter specified by the specifying input received by the interface.

5. The AI quality monitoring system according to claim 1, the AI quality monitoring system further comprising an interface that presents a result of the compared model selected by the compared model selector, wherein the interface presents at least one of:

information that identifies the compared model selected by the compared model selector;

the evaluation value; or a result of comparing an inferred result by the compared model with the correct answer data.

6. The AI quality monitoring system according to claim 1, the AI quality monitoring system further comprising a data collector that collects target data causing the learning model to perform inferring process by inputting the target data into the learning model, and wherein the quality determiner determines quality of the learning model by comparing an inferred result acquired by the learning model performing inferring process on the target data with an inferred result acquired by the compared model performing inferring process on the target data.

7. The AI quality monitoring system according to claim 1, wherein the quality determiner mutually compares inferred results by the compared models selected by the compared model selector, thereby inferring correct answer data, and wherein the quality determiner compares the inferred correct answer data with an inferred result by the learning model, thereby determining quality of the learning model.

8. The AI quality monitoring system according to claim 1, the AI quality monitoring system further comprising a first processor that performs inferring process by the learning model and a second processor that performs inferring process by the compared model, wherein the first and the second processors are configured by processors that work independently from each other.

9. The AI quality monitoring system according to claim 1, wherein the compared model selector and the quality determiner are implemented on computers different from each other, or are implemented by processors different from each other on a same computer.

10. The AI quality monitoring system according to claim 1, the AI quality monitoring system further comprising an interface that presents a determination result by the quality determiner, wherein the interface presents at least one of:

an inferred result by the learning model; or an inferred result by the compared model selected by the compared model selector.

11. The AI quality monitoring system according to claim 1, wherein the outputter outputs, via a network, report data that describes a determination result by the quality determiner.

12. The AI quality monitoring system according to claim 1, wherein a model is selected as the compared model that has same ones of pixel size of target data, color space of target data, number of bits used for representing color of target data, and content outputted as inferred result, as those of the learning model.

* * * * *